US007743040B2

(12) United States Patent
Rys et al.

(10) Patent No.: US 7,743,040 B2
(45) Date of Patent: Jun. 22, 2010

(54) METHOD AND APPARATUS FOR INFORMATION TRANSFORMATION AND EXCHANGE IN A RELATIONAL DATABASE ENVIRONMENT

(75) Inventors: Michael Rys, Issaquah, WA (US); Christopher Allen Suver, Seattle, WA (US); Istvan Cseri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1088 days.

(21) Appl. No.: 11/288,019

(22) Filed: Nov. 28, 2005

(65) Prior Publication Data
US 2006/0085409 A1   Apr. 20, 2006

Related U.S. Application Data (63) Continuation of application No. 10/764,612, filed on Jan. 26, 2004, now Pat. No. 7,337,177, which is a continuation of application No. 09/605,923, filed on Jun. 28, 2000, now Pat. No. 6,704,736.

(51) Int. Cl.
G06F 17/30 (2006.01)
G06F 17/00 (2006.01)
(52) U.S. Cl. .................................. 707/705; 715/210
(58) Field of Classification Search ............... 707/1–6; 715/234
See application file for complete search history.

(56) References Cited

U.S. PATENT DOCUMENTS

| | | | |
|---|---|---|---|
| 5,842,196 A | 11/1998 | Agarwal et al. | 707/2 |
| 5,970,490 A | 10/1999 | Morgenstern | 707/10 |
| 5,983,267 A | 11/1999 | Shklar et al. | 709/217 |
| 5,991,713 A | 11/1999 | Unger et al. | 704/9 |
| 6,065,048 A | 5/2000 | Higley | 709/218 |
| 6,073,143 A | 6/2000 | Nishikawa et al. | 707/513 |
| 6,209,124 B1 | 3/2001 | Vermeire et al. | 717/1 |
| 6,350,066 B1 | 2/2002 | Bobo, II | 395/200.36 |
| 6,356,920 B1 | 3/2002 | Vandersluis | 707/501.1 |
| 6,366,934 B1 * | 4/2002 | Cheng et al. | 715/210 |
| 6,377,953 B1 | 4/2002 | Gawlick et al. | 707/102 |

(Continued)

OTHER PUBLICATIONS

Bosak, J. et al., "XML and the Second-Generation Web", *Scientific American*, May 1999, 280(5), 7 pages.

(Continued)

*Primary Examiner*—Yicun Wu
(74) *Attorney, Agent, or Firm*—Woodcock Washburn LLP (57) ABSTRACT

A method and apparatus is disclosed for transforming hierarchical information into a rowset and for transforming a rowset into hierarchical information. In transforming hierarchical information, such as an XML data file, into a rowset, a parser parses the XML data file to form an active store. A query processor, after receiving a query including a number of metaproperties, processes data from the XML active store to form a rowset. The rowset can be processed further using a query language, such as the Structured Query Language (SQL). After processing, the rowset can be converted back into an XML data file using an XML formatter. An overflow feature facilitates the addition of text data to the rowset. A fusion feature facilitates defining a relationship between different data items in the rowset such that they can be merged into a single data element as the rowset is converted into an XML data file.

21 Claims, 8 Drawing Sheets

U.S. PATENT DOCUMENTS 6,704,736 B1    3/2004    Rys et al. .................... 707/100

OTHER PUBLICATIONS

Bosworth, A., "Europe SGML/XML", http://www.oasis-open.org/cover/bosworthXML98.html, Microsoft's Vision for XML, Aug. 9, 2000, 10 pages.

Shanmugasundaram, J. et al., "Relational Databases for Querying XML Documents: Limitations and Opportunities", *Proceedings of the Conference on Very Large Databases*, 1999, 13 pages.

Deutsch, A. et al., "Storing Semistructured Data with Stored", *SIGMOD*, 1999, 431-442.

\* cited by examiner

METHOD AND APPARATUS FOR INFORMATION TRANSFORMATION AND EXCHANGE IN A RELATIONAL DATABASE ENVIRONMENT

CROSS REFERENCE TO RELATED APPLICATIONS

This application is a continuation of U.S. patent application Ser. No. 10/764,612, filed Jan. 26, 2004, which is a continuation of U.S. patent application Ser. No. 09/605,923, filed Jun. 28, 2000, hereby incorporated by reference in its entirety.

TECHNICAL FIELD

The present invention relates generally to the conversion of information or data in computing systems, and more particularly to the conversion of hierarchical information or data to a relational database model and the conversion of information or data in a relational database model to hierarchical information or data.

BACKGROUND

The efficient communication of information over computer networks is very important for individuals, corporations, and governments in a world in which networks play an ever increasing role in commerce, science, and world affairs. Efficient communication of information is promoted in networked multi-vendor environments by having a standard method of formatting the information.

Relational databases provide one method of formatting, manipulating, and exchanging information in a networked computing environment. Relational databases are widely used, have been in use for many years, and have many support tools. For example, query languages, such as the Structured Query Language (SQL), are in common use for retrieving information from a relational database. Unfortunately, there are many competing relational database systems in use and the data formatting is not uniform among these systems. This variation in data formatting makes database files unsatisfactory vehicles for exchanging information in a multi-vendor environment.

On the other hand, in applications requiring information exchange, hierarchical data formats, such as the eXtensible Markup Language (XML), are becoming a standard. Using XML as a standard formatting language for exchanging information has several advantages. First, XML is a text based language, which allows the XML data to be exchanged across a multitude of computer systems that may be based on different binary data representations. Second, XML is a tag oriented language. Tags permit the creator of the data to express the semantics of the data and to capture the hierarchical relationships in the data in a way that is self-describing. Unfortunately, XML has not yet been extensively woven into relational database systems.

For these and other reasons there is a need for the present invention.

SUMMARY

The above-mentioned shortcomings, disadvantages and problems are addressed by the present invention, which will be understood by reading and studying the following specification.

The present invention provides a method for transforming hierarchical data, such as XML data, into a rowset and a system and method for transforming a rowset into hierarchical data, such as XML data. The hierarchical data may exist in an active store or may be parsed from a stream format. In addition, data not initially included in an active store may be introduced into the active store. In transforming hierarchical data into a rowset, the hierarchical data stream is parsed into an internal format (such as for example the document object model (DOM)) that is processed to form rowsets. This internal representation may be used as an active store before the rowsets are generated or it may be only a temporary representation for the duration of the rowset generation. When processing the internal representation, a query processor receives and processes a query to form the rowset from that representation. The query may be formulated using the Structured Query Language (SQL) SELECT statement, and may include a row pattern for defining row information, one or more column patterns for defining column information, and a number of metaproperties, which are properties implied by the information in the data stream.

Data in a hierarchical format includes explicit information and implicit information. The explicit information is information that is obtained from viewing the file. The implicit information is implied by the structure and hierarchy of the file. This implicit information is used in transforming hierarchical data into a rowset. In transforming hierarchical data into a rowset, the implicit information can explicitly be identified and saved as explicit information in the rowset.

In transforming a rowset into hierarchical data, row information, column information, and a number of metaproperties are identified in the rowset. The row information, column information and the number of metaproperties are used in transforming the rowset into hierarchical data.

The invention includes systems, methods, computers, and computer-readable media of varying scope. Besides the embodiments, advantages and aspects of the invention described here, the invention also includes other embodiments, advantage and aspects, as will become apparent by reading and studying the drawings and the following description.

DETAILED DESCRIPTION

In the following detailed description of the preferred embodiments, reference is made to the accompanying drawings that form a part hereof, and in which are shown by way of illustration specific embodiments in which the invention may be practiced. it is understood that other embodiments may be utilized and structural changes may be made without departing from the scope of the present invention.

Hardware Operating Environment

Figure 1:
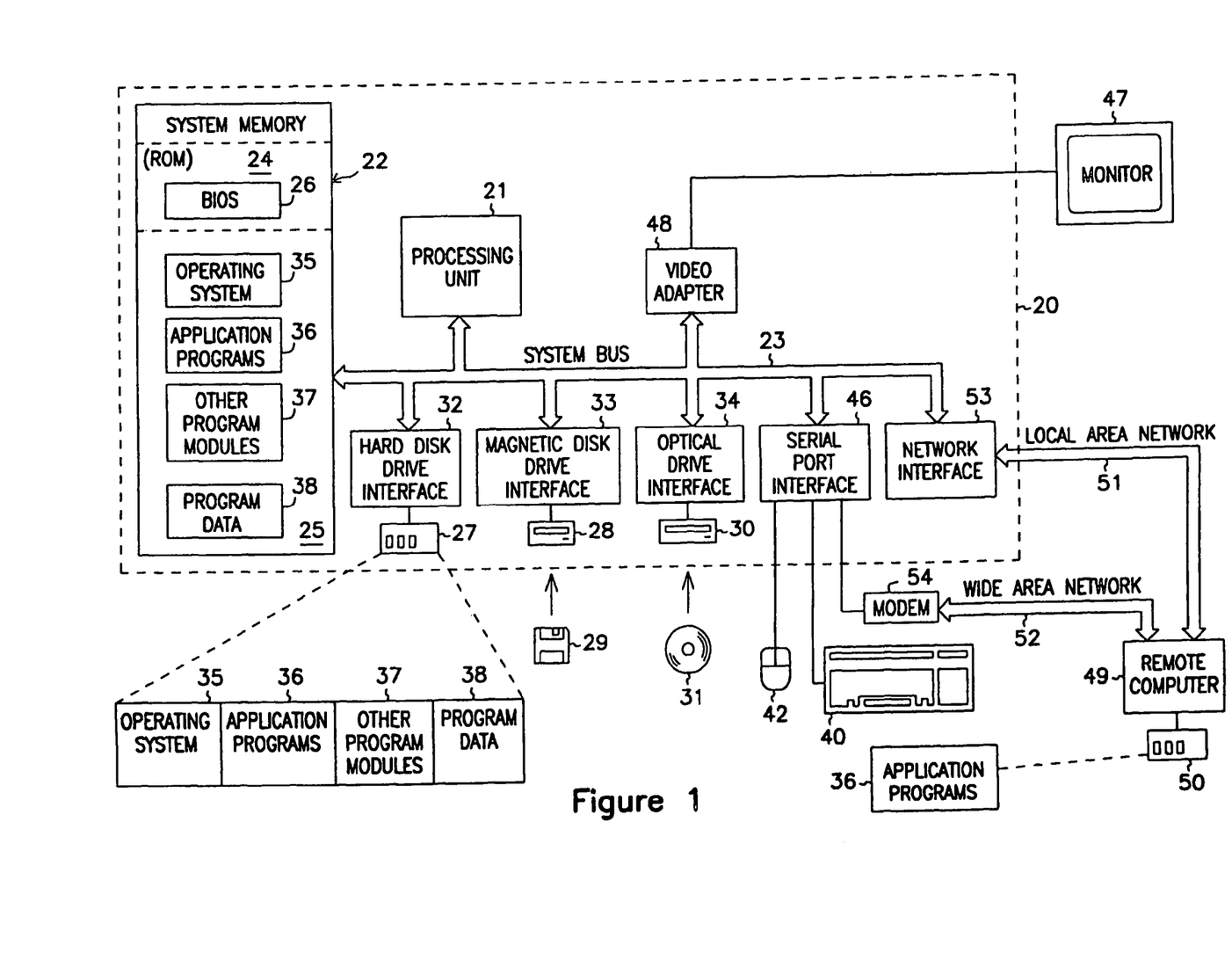
FIG. 1 illustrates example embodiments of a hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored or encoded in a machine readable medium such as the hard disk, magnetic disk 29, optical disk 31, ROM 24, RAM 25, or an electrical signal such as an electronic data stream through a communications channel, including an operating system 35, one or more application programs 36, other program modules 37, and program data 38. As described below in more detail, operating system 35 may allocate memory such as RAM 25 into kernel-mode memory or user-mode memory. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communications device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Example Embodiments of the Invention

Figure 2:
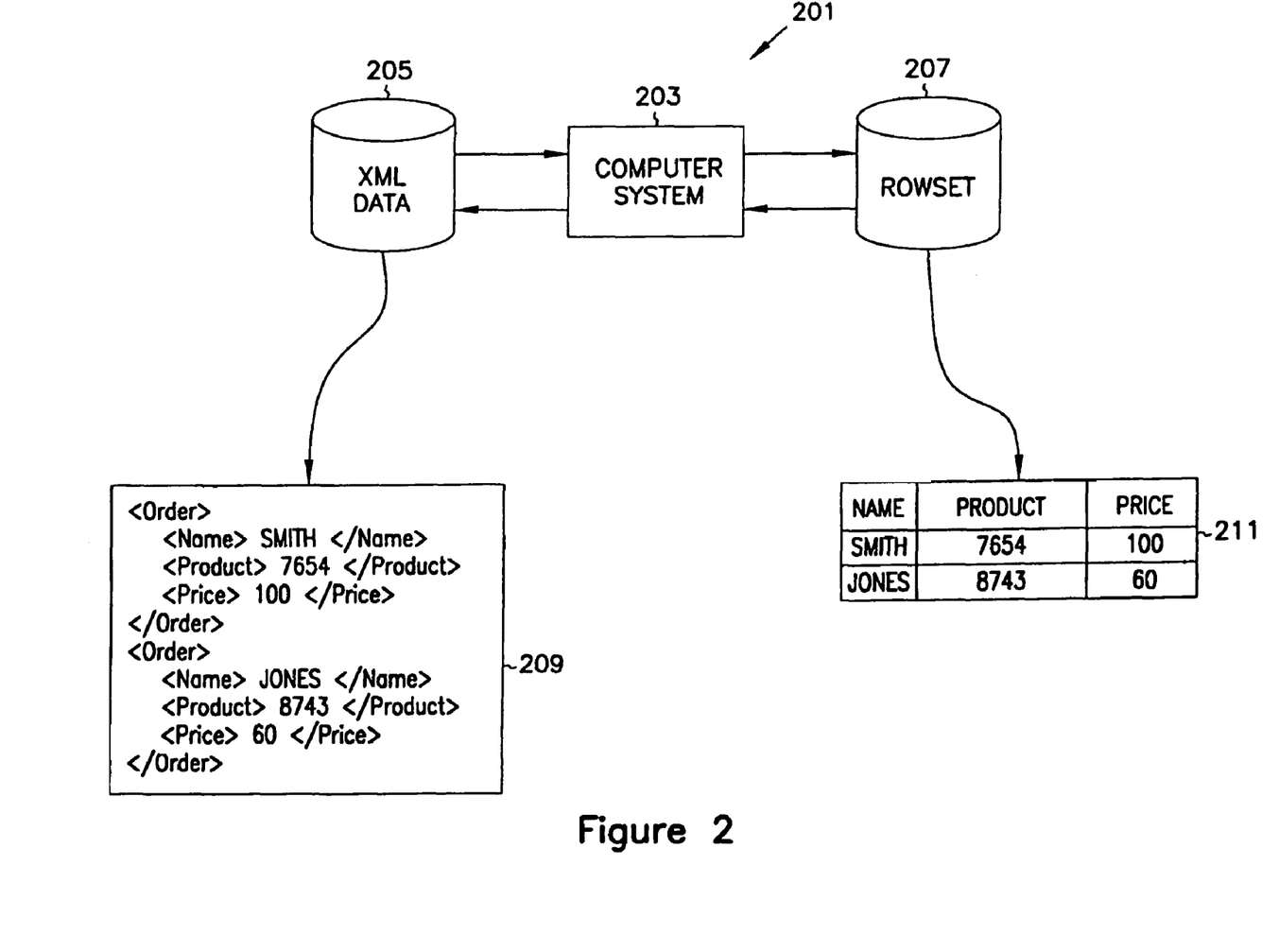
FIG. 2 is a block diagram of example embodiments of a computerized system for transforming an XML data file into a rowset and for transforming a rowset into an XML data file.

FIG. 2 is a block diagram of example embodiments of the present invention showing computerized system 201 including computer system 203 for transforming hierarchical information, such as eXtensible Markup Language (XML) data file 205, into rowset 207 and for transforming rowset 207 into hierarchical data, such as XML data file 205. XML data file 205 is only one example embodiment of hierarchical data suitable for use in connection with the present invention. A Structured Generalized Markup Language (SGML) data file is an alternate example embodiment of hierarchical data suitable for use in connection with the present invention. Both XML and SGML are useful for creating interchangeable structured documents. FIG. 2 also shows an example of hierarchical data 209 formatted as XML data and the corresponding relational data formatted as rowset data 211. Those skilled in the art will recognize that the present invention described for use in connection with hierarchical data and XML data is also suitable for use in connection with data represented in graphs.

In the present invention, computer system 203 is not limited to a particular type of computer system. Computer system 203 typically includes computers 20, as shown in FIG. 1, and commonly referred to as personal computers, mid-range computers, mainframe computers, and networks made up of these types of computers and other types of computers. Computer system 203 also includes the operating systems, such as operating system 35 shown in FIG. 1, associated with the above described computers and the methods for performing the above described transformations.

Also, in the present invention, XML data file 205 and rowset 207, which is sometimes referred to as a database table, are not limited to a collection of data stored in a semiconductor memory or on a magnetic or optical disk. XML data file 205 and rowset 207 also include any XML or rowset information stream, such as a character stream, capable of being processed by computer system 203. XML data file 205 and rowset 207 can be transmitted to computerized system 201 in a variety of ways. For example, data file 205 and rowset 207 can be transmitted to computerized system 201 as an electromagnetic wave over a fiber optic cable. Alternatively, data file 205 and rowset 207 can be transmitted to computerized system 201 over a conductive cable.

Figure 3:
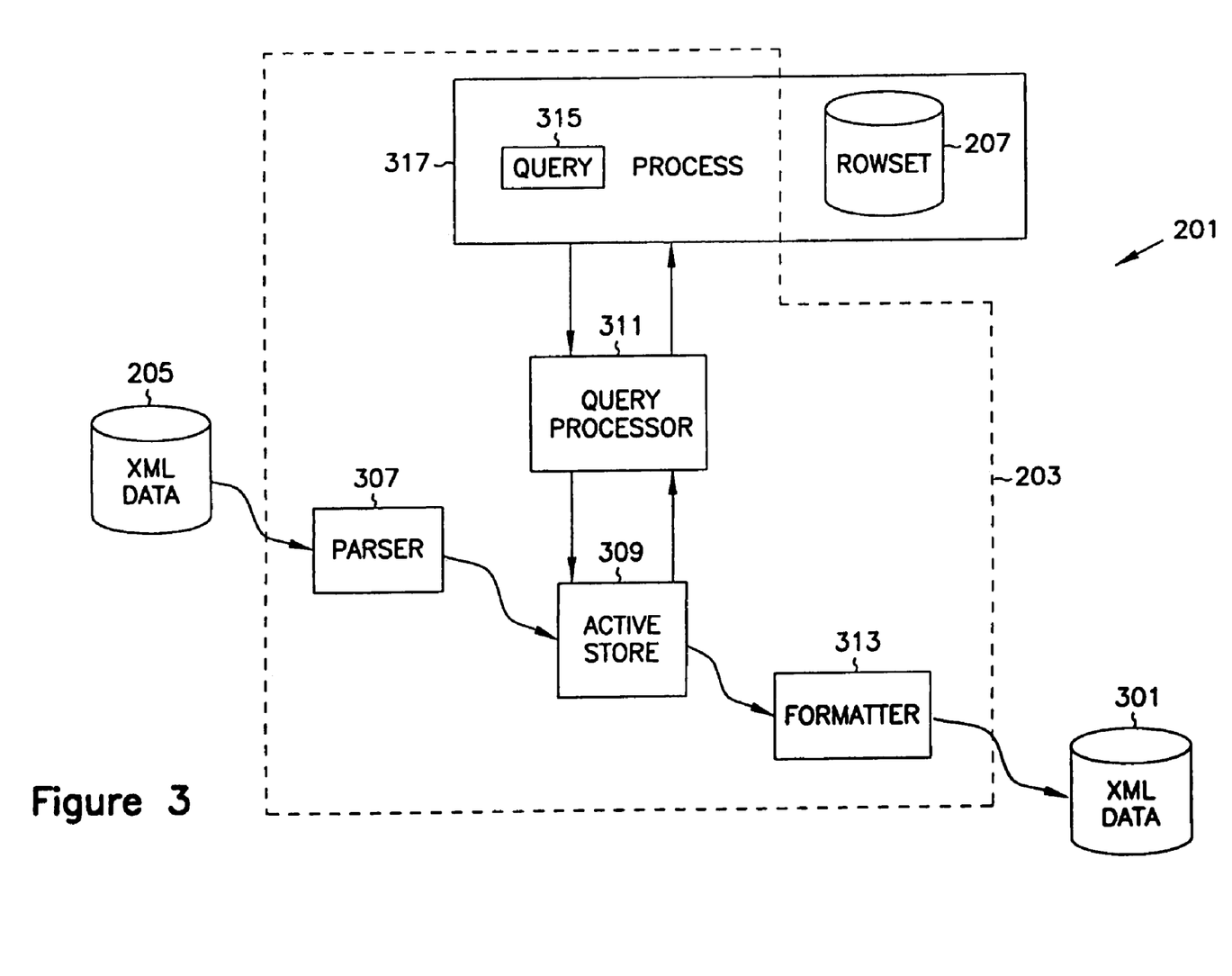
FIG. 3 is a detailed block diagram of example embodiments of the computerized system shown in FIG. 2.

FIG. 3 is a detailed block diagram of example embodiments of computerized system 201 shown in FIG. 2. Computerized system 201 shown in FIG. 3 includes computer system 203, XML data file 205, rowset 207 and XML data file 301. Computer system 203, in the example embodiments shown in FIG. 3, includes parser 307, active store 309, query processor 311, and formatter 313.

Parser 307 processes XML data file 205. In one embodiment, parser 307 processes a data stream version of XML data file 205 without storing the data stream in active store 309. In an alternate embodiment, parser 307 processes XML data file 205 and stores the processed XML data in active store 309. The XML data format includes tags which define the XML data format. The XML tags can be nested and parser 307 is capable of identifying the nesting and building a tree or edge table from the tags and information included in XML data file 205. Building a tree or edge table from the tags and information included in XML data file 205 assists parser 307 in transforming XML data file 205 into active store 309 and processing the information in active store 309. Information stored in active store 309 may be associated with a number of different types of data structures. For example, in one embodiment, the information is associated with a tree. In an alternate embodiment, the information is associated with an edge table. In a tree having parent and child nodes, the edges connecting the parent and child nodes can be represented in an edge table. Each row of the edge table represents a connection between two nodes of the tree. For example, for a tree including a parent node (A) having two children, nodes (B) and (C), the edge table representation includes three rows in which each row has a parent id column and an id column. In the first row representing the parent node (A), the parent id column refers to the parent of (A) and the id column identifies (A). The second row represents (B) and identifies (A) in the parent and (B) in the id column. Finally, the third row represents (C), where the parent id column identifies (A) and the id column identifies (C). Building a tree or an edge table includes the use of metaproperties, which are described below.

Parser 307 converts XML data file 205 into a format that is capable of being efficiently accessed and processed by query processor 311. For example, in one embodiment of the present invention, XML data file 205 is stored as tables in active store 309. Tables are efficiently accessed and processed by query processor 311. Alternatively, an XML data file 205 is stored in an internal representation such as the document object model (DOM) format in the active store 309. In one embodiment, parser 307 includes an XPath module or other module capable of identifying nodes in hierarchical data. An XPath module is defined in the World Wide Consortium (W3C) standard for parsing XML data, which is hereby incorporated by reference. (XML Path Language (XPath) Version 1.0, W3C Recommendation Nov. 16, 1999) The XPath module is operable for identifying the row information in active store 309. In an alternate embodiment, the XPath module is a modified W3C XPath module that is capable of processing information including metaproperties.

Active store 309 holds a parsed image of XML data file 205 for processing by query processor 311. Active store 309, in one embodiment, is a magnetic or magneto-optic device, such as a magnetic disk drive or a magneto-optic disk drive. Alternatively, active store 309 is a semiconductor storage device, such as a DRAM. Query processing performance in computerized system 201 is affected by the type of storage device selected for active store 309. For example, active store 309 embodied in a high speed semiconductor storage device provides faster access to the stored XML data in response to a query than active store 309 embodied in a magnetic or magneto-optic disk device.

In the operation of the present invention, query processor 311 receives query 315 from process 317. Query processor 311 extracts information, such as row information, column information, and metaproperty information, from query 315, processes the image of XML data file 205 in active store 309, and returns rowset 207 to process 317. For example, assume XML data file 205 includes a customer list with each customer in the list having a name, an account balance, and a zip code. Assume query 315 is a SELECT which requests the zip codes of all customers having an account balance of more than $100,000 dollars and a name starting with the letter "J." For one embodiment, in retrieving a subset of the information in active store 309 in response to the SELECT, row information is formatted as a row pattern that defines the pattern of characters being searched for in the rows of active store 309, and column information is formatted as a column pattern that defines the pattern of characters being searched for in the columns of active store 309. For an alternate embodiment, to locate information in active store 309 a path pattern is matched to the path information in active store 309. Query processor 311 retrieves a subset of the information in active store 309 and then selects the information that matches the query to form a rowset 207. Query processor 311 then returns rowset 207 to process 317. In this way, XML data 205 is processed as rowset information in a relational database model.

Formatter 313 is operable for transforming the information in active store 309 to XML data file 301. In transforming the information in active store 309 to XML data file 301 formatter 313 utilizes metaproperties in parsing active store 309 into XML tags and XML tagged information and in organizing the information. For example, the parent metaproperty is used in parsing the hierarchical structure of active store 309. The parent metaproperty identifies the parent of each data element in a hierarchical data structure.

Metaproperties are useful and necessary in transforming XML data into a rowset and for transforming a rowset into XML data. A metaproperty is a property associated with an XML data file or graph or hierarchical input that is not explicitly included as character information contained in the XML data file. For example, the parent metaproperty associates each node in an XML data file with a parent node. As described above, metaproperties are used by parser 307 in transforming XML data file 205 into active store 309 and by formatter 313 in transforming the information in active store 309 into XML data 301. As an XML data stream is transformed into a rowset, the metaproperties associated with the XML data stream can be explicitly preserved in the rowset. Metaproperties are also used in generating a rowset 207 from active store 309. To generate a rowset, query processor 311 receives a query and generates a query plan for processing information contained in active store 309. The query plan includes the information provided by the metaproperties included in the query.

A metaproperty is a property associated with an XML data file that is not explicitly included as character information contained in the XML data file. One embodiment of the present invention includes the following metaproperties: id, parent, parent id, previous (and/or next) neighbor, datatypes, and DOM node type. The id metaproperty provides a method of assigning an identifier to tagged information in an XML file. Once an id is associated with tagged information, the id metaproperty can be used in a query to reference the tagged information directly. The parent metaproperty provides a method of associating each node in an XML data file with a parent node. The parent id metaproperty provides a method for associating an id of a parent node with each child node related to the parent node. The previous (and/or next) neighbor metaproperty provides a method for identifying the immediate neighbor of tagged XML information in an XML data file. The datatype metaproperty provides a method of associating each element of information in an XML data file with a datatype. Finally, the DOM node type provides a method of associating each node in an XML data file with a DOM node type. Those skilled in the art will recognize that other metaproperties capable of exposing implicit properties in XML or other hierarchical data may be identified, developed, and used in connection with the present invention.

Figure 4A:
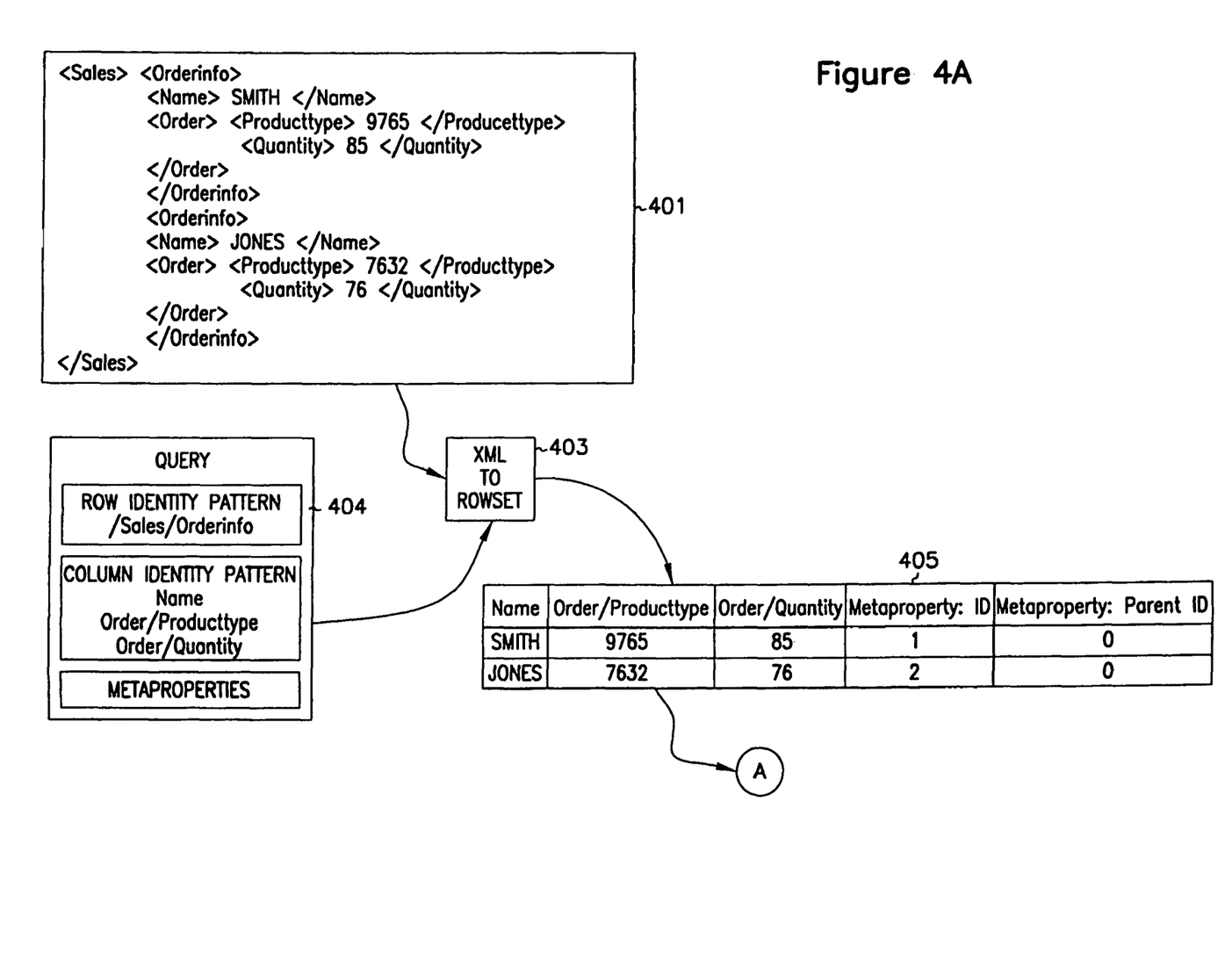
FIGS. 4A, 4B, and 4C illustrate example embodiments of a method for processing XML data.
Figure 4B:
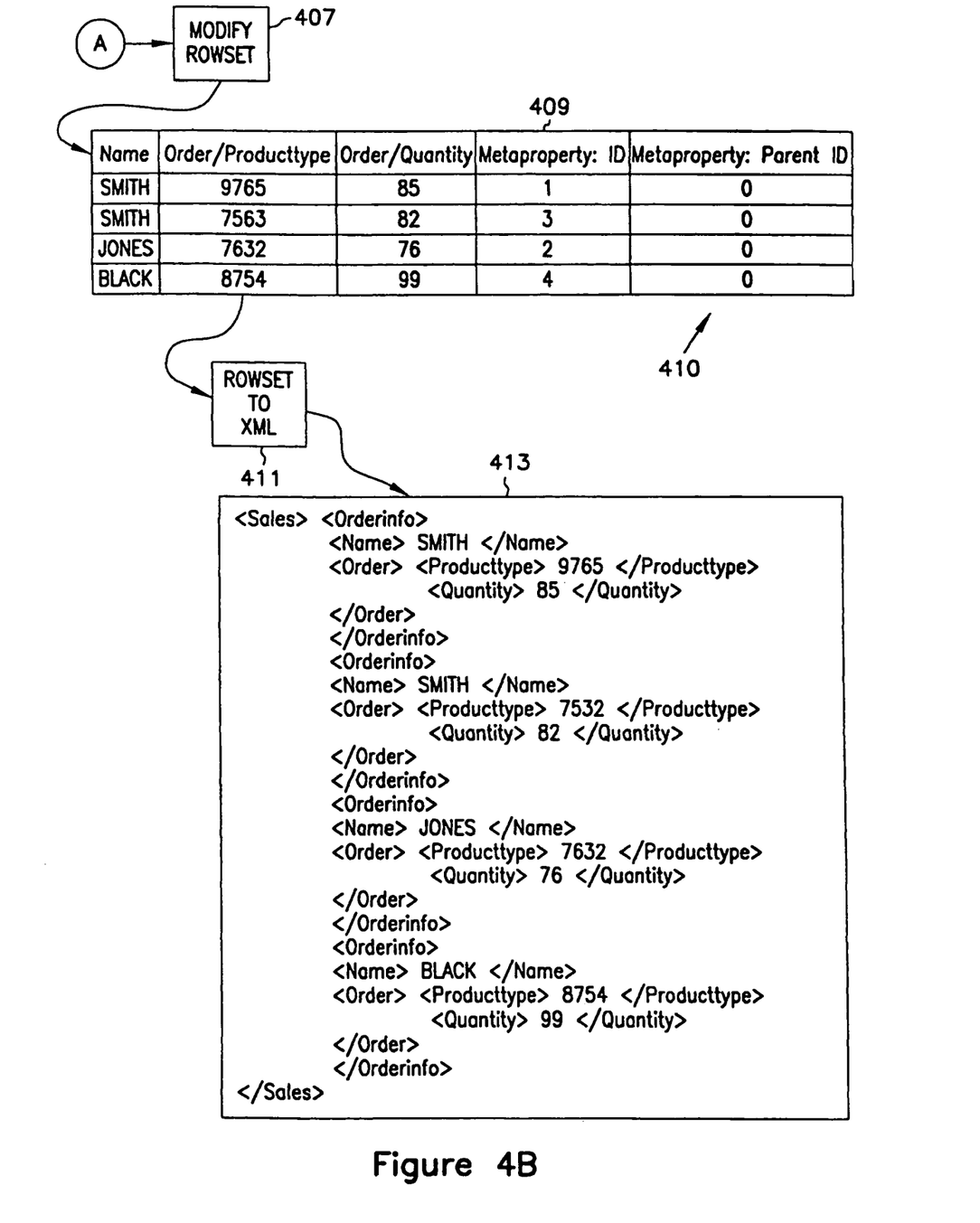

FIGS. 4A and 4B illustrate example embodiments of a method for processing XML data 401. XML data is tag formatted text data which can be viewed using a text editor. XML data 401 describes order information for a number of sales. The tags, such as the "Sales" tag and the "Orderinfo" tag are enclosed in brackets. The tagged data is unbracketed text located between the tags. For example, the name "SMITH" is the tagged data associated with the "Name" tag. The present invention is not limited to associating names with tags. Any structure or method of associating data with a name is suitable for use in connection with the present invention. For example, in XML data can also be stored in XML attributes.

The sales information in XML data 401 includes "Orderinfo" including the purchaser's "Name" and the "Order" which includes the "Producttype" and the "Quantity." The XML to rowset process 403 transforms XML data 401 to rowset 405 in response to query 404. XML to rowset process 403 takes as input query 404 which includes row information, such as a row identity pattern, column information, such as a column identity pattern, and a number of metaproperties. In this example, the row identity pattern is "/Sales/Orderinfo", and the column identity pattern includes "Name", "Order/Producttype", and "Order/Quantity." The metaproperties include the parent ID metaproperty and the ID metaproperty. The parent ID metaproperty identifies "Sales" (with ID 0) as being the parent of two instances of "Orderinfo" (IDs 1 and 2). The first instance is the "Orderinfo" for "Smith" and the second instance is the "Orderinfo" for "Jones." Since "Jones" and "Smith" have the same parent, the parent ID metaproperty identifies "Jones" and "Smith" as parallel row information. The row information, column information, and metaproperties are used to form rowset 405, which is suitable for processing using relational techniques.

After XML data 401 is transformed into rowset 405, in one embodiment of the present invention, rowset 405 may be modified by process 407, as shown in FIG. 4B. For example, rowset 405 may be modified by an INSERT operation, which adds information to rowset 405. In the example shown in FIG. 4B, an order for the name "Smith" including a product type of "7563" and a quantity of "82" is inserted into rowset 405 and an order for the name "Black" including a product type of "8754" and a quantity of "99" are inserted into rowset 405 to form rowset 409. After the insertion, rowset 409 also includes parent IDs, as shown in column 410. The parent ID metaproperty identifies "Sales" (with ID 0) as being the parent of four instances of "Orderinfo" (IDs 1, 2, 3, and 4). An INSERT statement, in one embodiment of the present invention, includes a pathname, which indicates where in the hierarchy to add the information and the actual data to be inserted. Rowset to XML process 411 transforms rowset 409 into XML data 413. In this transformation, the parent ID metaproperty identifies the inserted row of information "Black 8754 99" to be tagged and inserted into XML data 413.

Figure 4C:
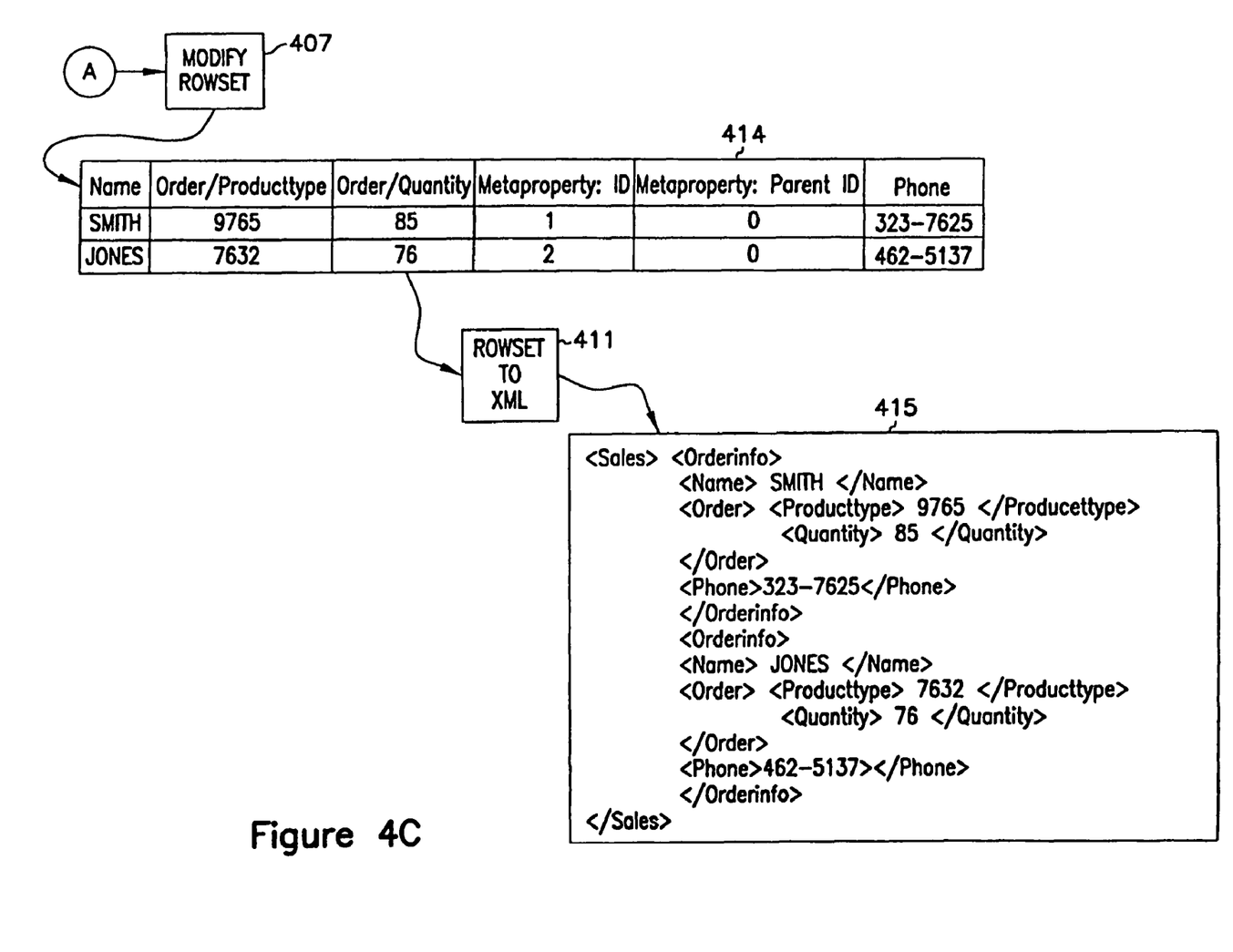

Separate data elements are fusible in an XML data file or in a rowset, if the data elements have the same ID metaproperty. For example, if the rowset 405 has a new column entitled "Phone" added by process 407 to form rowset 414, as shown in FIG. 4C, then the rowset to XML transformation 411 identifies rowsets with the ID metaproperty values that already exist in the internal representation 309 and fuses the new properties and values to the already existing values in the XML document 401 to form document 415.

Figure 4D:
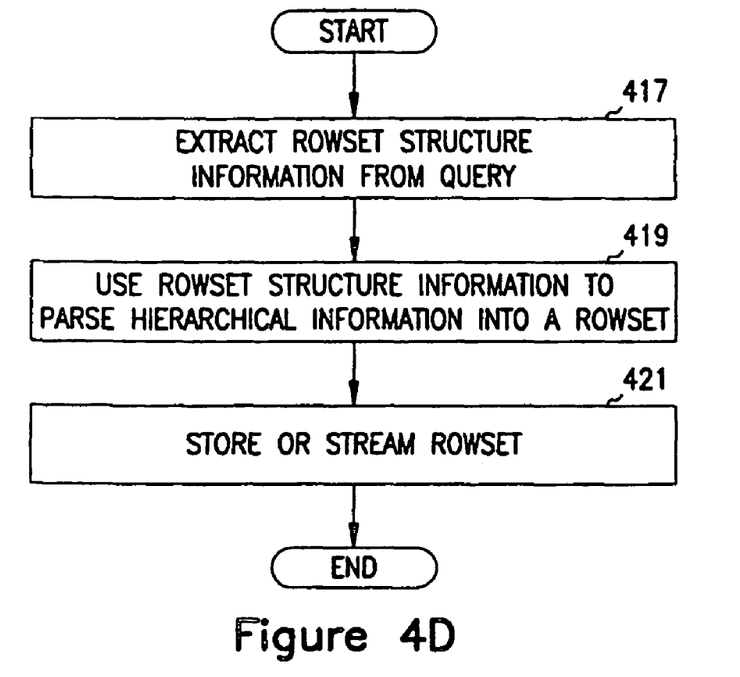
FIG. 4D is a flow diagram of an example embodiment of a method for producing a rowset from hierarchical data.

FIG. 4D is a flow diagram of an example embodiment of a method for producing a rowset from hierarchical data, such as XML data. To produce a rowset from hierarchical data, rowset structure information is first extracted from a query (block 417). The query includes row identity pattern information, column identity pattern information, and metaproperties, such as ID and parent ID. The hierarchical data is processed using rowset structure information (block 419) to form rows matching the row identity pattern provided in the query and columns matching the column identity pattern provided in the query. Metaproperties provided in the query are added as columns in the rowset data. For example, as shown in rowset 405, a metaproperty ID column and a metaproperty parent ID column are included in the rowset. The metaproperty ID column includes IDs provided in the query used in constructing rowset 405. The metaproperty parent ID column includes parent ID information that was implicit in XML data 401 used to create rowset 405. The rowset may then be stored or streamed (block 421) without storing.

Figure 4E:
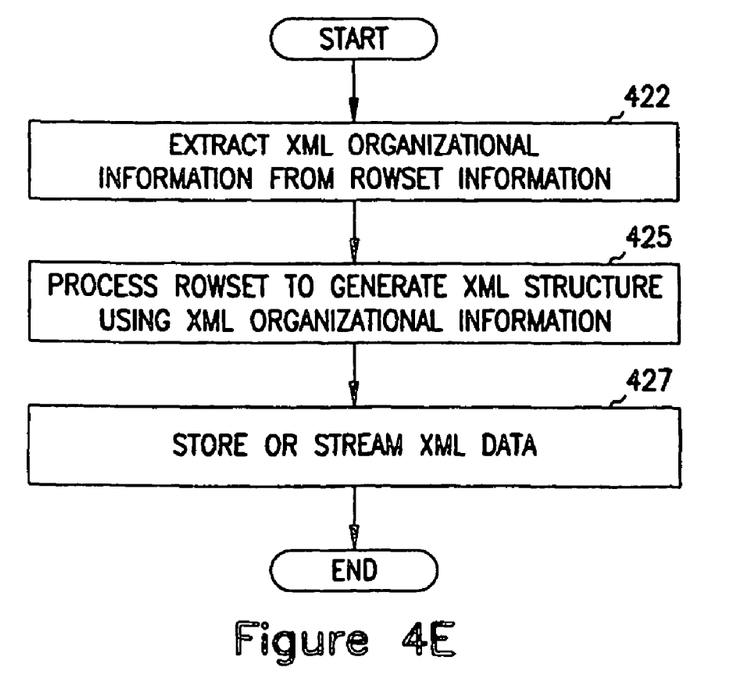
FIG. 4E is a flow diagram of an example embodiment of a method for producing an XML data stream from a rowset.

FIG. 4E is a flow diagram of an example embodiment of a method for producing an XML data stream from a rowset. To produce an XML data stream from a rowset, XML organization information is first extracted from the rowset information (block 422). Metaproperties, such as ID and parent ID included in rowset 409, shown in FIG. 4B, provide hierarchical organization information for transforming the rowset in to an XML data stream. Rowset information is processed to generate XML structure using the XML organizational information (block 425). Finally, the XML structure can be stored or transmitted as a stream.

In summary, the method illustrated in FIGS. 4A and 4B transforms XML data 401 into rowset 405 using row pattern information, column pattern information, and metaproperties provided in query 404. Process 407 is applied to rowset 405 to form rowset 409. After applying process 407, rowset 409 includes the added "Phone" column and the added rows of order information "Smith 7563 82 3 0 555-0102" and "Black 8754 99 4 0 555-0104". Rowset to XML process 411 transforms rowset 409 into XML data 413. XML data 413 is suitable for transmission in a computer network or viewing using a text editor. No data is lost in performing the transformation.

Figure 5:
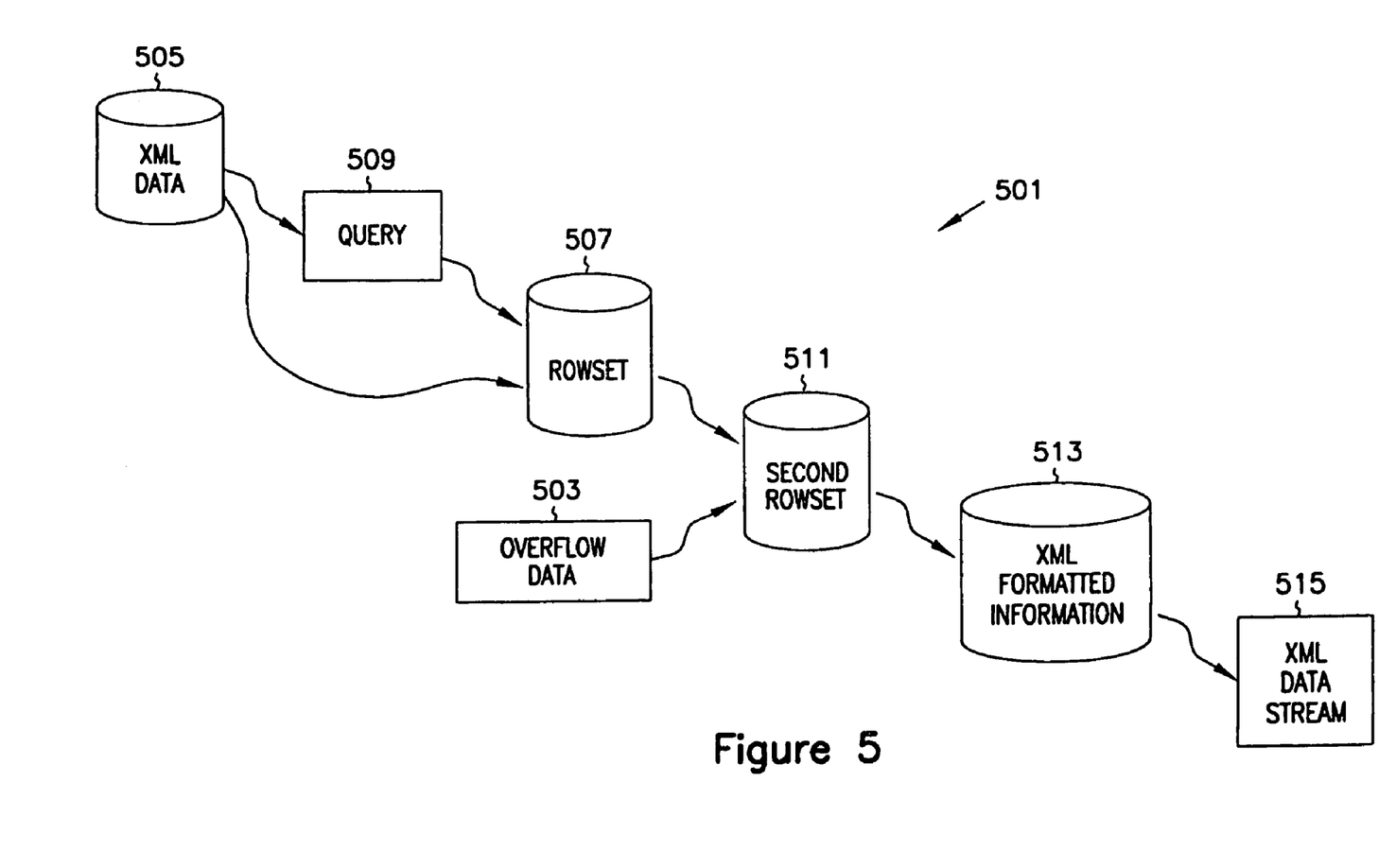
FIG. 5 is a block diagram of example embodiments of a method for including overflow data in an XML data file.

FIG. 5 is a block diagram of example embodiments of a method 501 for including overflow data 503 in XML data file 505. In the example embodiment illustrated in FIG. 5, XML data file 505 is first transformed into rowset 507. In one embodiment, XML data 505 is transformed into rowset 507 by processing XML data 505 using query 509 to generate rowset 507. In an alternate embodiment, XML data file 505 is directly transformed into rowset 507. Overflow data 503 is added to rowset 507 to form second rowset 511. Overflow data 503 is a category of XML data that does not fit into the row or column categories that make up rowset 507. For example, if rowset 507 includes a list of customers, overflow data 503 could be text information describing products that have been marketed to the list of customers. Using an overflow metaproperty that identifies the overflow data incorporated in second rowset 511, second rowset 511 is converted back into XML formatted information 513. XML formatted information 513 is then suitable for transmission as XML data stream 515. The capability to add overflow data to XML data files and to rowsets is very useful for annotating the information contained in rowsets or XML data files.

Thus, while the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof.

What is claimed:

1. A system for querying hierarchical data, the system comprising:
    a memory having stored therein computer-executable instructions;
    a computer processor that executes computer executable-instructions;
    a parser for receiving the hierarchical data and parsing the hierarchical data from a hierarchical format into first query-able rowset data having a rowset format of an edge table that represents a data tree having at least one parent node and at least one child node, each node having a respective node identification, the edge table comprising rows each corresponding to a node of the data tree, the edge table further comprising an id column and a parent id column, the id column comprising a respective node identification for the node corresponding to each row of the edge table, the parent id column comprising a respective node identification for a parent node of the node corresponding to each row of the edge table, the hierarchical data being in a script form and including a plurality of non-partitioned data elements and the parsed first rowset data from the parser including a plurality of partitioned data elements organized into a table of cells based at least on one or more metaproperties of the hierarchical data, each partitioned data element within the table residing in a separate cell and corresponding to a non-partitioned data element of the hierarchical data, wherein the rowset format explicitly preserves one or more implicit metaproperties associated with the hierarchical data;
    a query provider for generating a query to be applied to the first rowset data; and
    a query processor for receiving the generated query from the query provider, processing the received query to extract query information relevant to the first rowset data, accessing and processing the first rowset data from the parser based on the extracted query information to result in second rowset data, and returning the second rowset data to the query provider.

2. The system of claim 1 wherein the hierarchical data is one of XML and SGML data.

3. The system of claim 1 wherein the first rowset data is a table including the partitioned data elements organized into a plurality of rows and columns.

4. The system of claim 1 further comprising a store for receiving the first rowset data from the parser and for being accessed by the query processor.

5. The system of claim 1 wherein each non-partitioned data element in the hierarchical data includes an identifying tag and is nested within the hierarchical data based on the tag, and wherein the parser identifies nesting of the hierarchical data based on the tags and builds the first rowset data according to the identified nesting.

6. The system of claim 1 wherein the query processor extracts query information from the query including row information, column information, and/or metaproperty information relevant to the first rowset data, and based on the extracted query information, returns corresponding row data, column data, and/or metaproperty data from the first rowset data as the second rowset data.

7. A method of querying hierarchical data, the method comprising:
    using at least one processor for:
    receiving the hierarchical data and parsing the hierarchical data from a hierarchical format into first query-able rowset data having a rowset format of an edge table that represents a data tree having at least one parent node and at least one child node, each node having a respective node identification, the edge table comprising rows each corresponding to a node of the data tree, the edge table further comprising an id column and a parent id column, the id column comprising a respective node identification for the node corresponding to each row of the edge table, the parent id column comprising a respective node identification for a parent node of the node corresponding to each row of the edge table, the hierarchical data being in a script form and including a plurality of non-partitioned data elements and the parsed first rowset data from the parser including a plurality of partitioned data elements organized into a table of cells based at least on one or more metaproperties of the hierarchical data, each partitioned data element within the table residing in a separate cell and corresponding to a non-partitioned data element of the hierarchical data, wherein the rowset format explicitly preserves one or more implicit metaproperties associated with the hierarchical data;

receiving a query to be applied to the first rowset data;

processing the received query to extract query information relevant to the first rowset data;

accessing and processing the first rowset data based on the extracted query information to result in second rowset data; and returning the second rowset data to the query provider.

8. The method of claim 7 comprising using the processor for receiving the hierarchical data as one of XML and SGML data.

9. The method of claim 7 comprising using the processor for parsing the hierarchical data into the first rowset data as a table including the partitioned data elements organized into a plurality of rows and columns.

10. The method of claim 7 further comprising using the processor for placing the first rowset data into a store and accessing the first rowset data from the store.

11. The method of claim 7 wherein each non-partitioned data element in the hierarchical data includes an identifying tag and is nested within the hierarchical data based on the tag, the method comprising using the processor for identifying nesting of the hierarchical data based on the tags and building the first rowset data according to the identified nesting.

12. The method of claim 7 comprising using the processor for extracting query information from the query including row information, column information, and/or metaproperty information relevant to the first rowset data, and based on the extracted query information returning corresponding row data, column data, and/or metaproperty data from the first rowset data as the second rowset data.

13. A system for querying hierarchical data, the system comprising:

a memory having stored therein computer-executable instructions;

a computer processor that executes the computer-executable instructions;

a query processor for receiving the hierarchical data and parsing the hierarchical data from a hierarchical format into query-able rowset data having a rowset format of an edge table that represents a data tree having at least one parent node and at least one child node, each node having a respective node identification, the edge table comprising rows each corresponding to a node of the data tree, the edge table further comprising an id column and a parent id column, the id column comprising a respective node identification for the node corresponding to each row of the edge table, the parent id column comprising a respective node identification for a parent node of the node corresponding to each row of the edge table, the hierarchical data being in a script form and including a plurality of non-partitioned data elements and the parsed rowset data including a plurality of partitioned data elements organized into a table of cells based at least on one or more metaproperties of the hierarchical data, each partitioned data element within the table residing in a separate cell and corresponding to a non-partitioned data element of the hierarchical data, wherein the rowset format explicitly preserves one or more implicit metaproperties associated with the hierarchical data.

14. The system of claim 13 wherein the hierarchical data is one of XML and SGML data.

15. The system of claim 13 wherein the rowset data is a table including the partitioned data elements organized into a plurality of rows and columns.

16. The system of claim 13 further comprising a store for receiving the rowset data from a parser and for being accessed by the query processor.

17. The system of claim 13 wherein each non-partitioned data element in the hierarchical data includes an identifying tag and is nested within the hierarchical data based on the tag, and wherein a parser identifies nesting of the hierarchical data based on the tags and builds the first rowset data according to the identified nesting.

18. The system of claim 13 wherein the query processor extracts query information from the query including row information, column information, and/or metaproperty information relevant to the first rowset data, and based on the extracted query information, returns corresponding row data, column data, and/or metaproperty data from the rowset data as second rowset data.

19. A method of querying hierarchical data, the method comprising:

using at least one processor for:

receiving the hierarchical data as one of XML and SGML data and by a query processor;

parsing the hierarchical data from a hierarchical format into query-able rowset data having a rowset format of an edge table that represents a data tree having at least one parent node and at least one child node, each node having a respective node identification, the edge table comprising rows each corresponding to a node of the data tree, the edge table further comprising an id column and a parent id column, the id column comprising a respective node identification for the node corresponding to each row of the edge table, the parent id column comprising a respective node identification for a parent node of the node corresponding to each row of the edge table, the hierarchical data being in a script form and including a plurality of non-partitioned data elements and the parsed rowset data including a plurality of partitioned data elements organized into a table of cells based at least on one or more metaproperties of the hierarchical data, each partitioned data element within the table residing in a separate cell and corresponding to a non-partitioned data element of the hierarchical data, wherein the rowset format explicitly preserves one or more implicit metaproperties associated with the hierarchical data, and wherein each non-partitioned data element in the hierarchical data includes an identifying tag and is nested within the hierarchical data based on the tag;

identifying nesting of the hierarchical data based on the tags and building the first rowset data according to the identified nesting; and placing the rowset data into a store and accessing the rowset data from the store.

20. The method of claim 19 comprising using the processor for parsing the hierarchical data into the rowset data as a table including the partitioned data elements organized into a plurality of rows and columns.

21. The method of claim 19 comprising using the processor for extracting query information from the query including row information, column information, and/or metaproperty information relevant to the first rowset data, and based on the extracted query information returning corresponding row data, column data, and/or metaproperty data from the rowset data as the second rowset data.

* * * * *